(12) United States Patent
Forsblom et al.

(10) Patent No.: US 11,352,171 B2
(45) Date of Patent: Jun. 7, 2022

(54) PAPER BAG

(71) Applicant: Billerudkorsnas AB, Solna (SE)

(72) Inventors: Valdemar Forsblom, Linkoping (SE); Ove Lindstrom, Kalix (SE); Andreas Abacka, Jakobstad (FI)

(73) Assignee: BillerudKorsnas AB, Solna (SE)

( * ) Notice: Subject to any disclaimer, the term of this patent is extended or adjusted under 35 U.S.C. 154(b) by 0 days.

(21) Appl. No.: 17/599,523

(22) PCT Filed: Aug. 27, 2020

(86) PCT No.: PCT/EP2020/073938
§ 371 (c)(1),
(2) Date: Sep. 28, 2021

(87) PCT Pub. No.: WO2021/037958
PCT Pub. Date: Mar. 4, 2021

(65) Prior Publication Data
US 2022/0089329 A1    Mar. 24, 2022

(30) Foreign Application Priority Data

Aug. 27, 2019  (EP) .................................... 19193881

(51) Int. Cl.
*B65D 30/20* (2006.01)
*B65D 33/08* (2006.01)
*B65D 75/00* (2006.01)
*B65D 65/38* (2006.01)
*B65D 33/20* (2006.01)

(52) U.S. Cl.
CPC ............. *B65D 31/10* (2013.01); *B65D 33/08* (2013.01); *B65D 33/20* (2013.01); *B65D 65/38* (2013.01); *B65D 75/008* (2013.01)

(58) Field of Classification Search
CPC ........ B65D 31/10; B65D 33/08; B65D 33/20; B65D 65/38; B65D 75/008
USPC ......................................................... 383/200
See application file for complete search history.

(56) References Cited

U.S. PATENT DOCUMENTS

| 10,132,043 B2 * | 11/2018 | Almkvist ............... D21H 19/36 |
| 10,458,070 B2 * | 10/2019 | Almkvist ................ B31F 1/126 |
| 10,570,569 B2 * | 2/2020 | Nordstrom ................ B65B 9/20 |
| 2006/0204148 A1 | 9/2006 | Kohn et al. |
| 2016/0122084 A1 * | 5/2016 | Eberhard ................ B31B 50/81 383/10 |

(Continued)

FOREIGN PATENT DOCUMENTS

| DE | 202014011111 U1 | 11/2017 |
| EP | 3250464 B1 | 12/2018 |

(Continued)

*Primary Examiner* — Jes F Pascua
(74) *Attorney, Agent, or Firm* — Stites & Harbison PLLC; Richard S. Myers, Jr.

(57) ABSTRACT

A paper bag for e-commerce shipments, which paper bag comprises first closure means for first closure of the bag (46, 49, 123, 127a, 127b, 227a, 337, 337a), tear means (47, 126, 136, 226a, 226b, 336) for opening the bag after first closure and second closure means (45, 48, 137, 137a, 238a, 238b, 338, 338a) for reclosing the bag after tearing the tear means. The paper bag is formed of a paper having specific properties concerning—inter alia—the grammage, the tensile index, the bending resistance and the like for rendering the bag especially durable and reliable in use.

14 Claims, 7 Drawing Sheets

(56) References Cited

U.S. PATENT DOCUMENTS

2016/0355985 A1\* 12/2016 Hashiguchi ............. D21F 9/003
2020/0130897 A1\* 4/2020 Schmoor ................ B65D 33/22
2021/0348339 A1\* 11/2021 Lindstrom ............. D21F 11/00

FOREIGN PATENT DOCUMENTS

| EP | 3530585 A1 \* | 8/2019 | ............. B65D 33/18 |
| EP | 3556679 B1 \* | 2/2021 | ........... B31B 70/628 |
| WO | WO99/02772 A1 | 1/1999 | |

\* cited by examiner

PAPER BAG

CROSS REFERENCE TO RELATED APPLICATIONS

This application is a § 371 National State Application of PCT/EP2020/073938 filed Aug. 27, 2020, which claims priority to SE 19193881.0 filed Aug. 27, 2019.

TECHNICAL FIELD

The present disclosure generally relates to paper bags. In particular, a paper bag for receiving and containing goods during shipment of the goods, which bag is suitable for so called e-commerce shipments.

BACKGROUND

The market for e-commerce packaging is currently dominated by corrugated boxes and polybags. From an environmental perspective, it would be desirable to replace polybags by bags made of paper since paper has a much lower environmental impact than bags made from polymer materials. Further, corrugated boxes are comparatively bulky and often occupies large shipment volumes in relation to the volume of the goods to be shipped and contained therein. This leads to ineffective usage of load spaces which also has a negative impact on the environment.

The great increase of e-commerce and the related shipments experienced during recent years greatly emphasizes the need to replace the polybags and corrugated boxes by more environmental friendly alternatives such as paper bags.

At e-commerce shopping the end customer typically orders the items to be purchased from the provider on-line over the Internet. The provider then loads the ordered items into a shipping packaging or container which is sent by regular postal service or courier. The shipment could be addressed either directly to the home of end customer or to another delivery point, where the customer may collect the packaging and bring it home. Thereafter the customer may tear open the packaging and inspect the delivered items. In case at least some of the items are not satisfactory to the customer it is desirable if it is possible for the customer to reload the unwanted items into the same packaging, to reclose it and thereafter to resend it to the provider.

In the prior art, it has been suggested to provide paper bags for such e-commerce shipments. EP3250464B1 discloses a paper bag having first and second seal means with intermediate tear opening means arranged at a first end of the bag. In addition, the bag has a handle at an opposite end of the bag.

SUMMARY

One object of the present disclosure is to provide an enhanced paper bag which is suitable for e-commerce shipments.

Another object is to provide such a paper bag which easy to handle.

A further object is to provide such a paper bag which is durable and reliable in use.

Yet another object is to provide such a paper bag which may readily be formed on conventional paper converting machines.

Still another object is to provide such a paper bag which may be efficiently manufactured with high yield, few production interruptions and low loss of paper material.

To meet these objects, the inventors have realized that the properties of the paper used for forming the bag is of crucial importance for achieving a paper bag which, on the one hand may readily be manufactured on existing converting machines after minimal modifications and, on the other hand is easy to handle and reliable in use.

The inventors have realized that it is important that the paper has a sufficiently high bending resistance and a limited stretchability in order to be able to produce the bags at high speed with comparatively small risk of jamming and other unplanned production stops in the paper converting machines. Additionally, they have realized that a sufficiently high tear strength, TEA, burst strength and puncture resistance is of great importance for the usability of the bag when handled throughout the distribution lines of e-commerce shopping and return shipments.

The present disclosure thus provides a paper bag for e-commerce shipments, which paper bag comprises first closure means for first closure of the bag, tear means for opening the bag after first closure and second closure means for reclosing the bag after tearing the tear means, wherein the paper bag is formed of a paper having the following properties;

- a grammage of 70 to 150, such as 90 to 120 g/m$^2$ according to ISO 536:2012;
- a tensile index in the machine direction (MD) of 80 to 120, such as 85 to 105 Nm/g according to ISO 1924-3:2005;
- a tensile index in the cross direction (CD) of 45 to 80, such as 50 to 70 Nm/g according to ISO 1924-3:2005;
- a tensile energy absorption (TEA) index in the MD of 1.7 to 3.5, such as 2.0 to 3.0 J/g according to ISO 1924-3:2005;
- a TEA index in the CD of 2.0 to 3.5, such as 2.5 to 3.5 J/g according to ISO 1924-3:2005;
- a bending resistance index in the MD of 115 to 300, such as 125 to 260 Nm$^6$/kg$^3$ according to ISO2493-1:2010
- a bending resistance index in the CD of 80 to 145, such as 85 to 140 Nm$^6$/kg$^3$ according to ISO2493-1:2010
- a puncture force index of 80 to 120, such as 87 to no Nm$^2$/kg according to EN-14477
- a burst index of 5.0 to 6.5, such as 5.3 to 6.2 kPam$^2$/g according to ISO 2758:2014
- a virgin fibre content of at least 90%, such as at least 95%; and
- a soft wood fibre content of at least 70%, such as at least 80%.

The bending resistance is tested using a bending angle of 15° and a test span length of 10 mm.

The paper bag thus allows for that goods may be loaded through the opening and that the bag thereafter may be closed by means of the first closure means. The bag may thereafter be shipped e.g. to the customers' home or a pick-up store, where the customer may collect the bag and carry it home. For retrieving the goods, the tear means is torn, whereby a new opening is formed in the bag. In cases when the customer wants to return some of or all the goods to the sender, such goods may be loaded through the new opening which thereafter may be closed by closing the means for reclosing.

The bag thus provides a very easy and efficient way of handling the bag both for the original sender, any distributor involved in transporting the bag, personnel at the pick-up facility as well as the customer.

By forming the bag from a paper having the above specified properties it has proven that the bag may readily be formed on conventional paper converting machines at high speeds without risking jamming or other disturbances, which otherwise may cause unplanned production stops, material spillage, increased costs and reduced productivity.

At the same time, the specified paper provides excellent properties of the bag in use. The so formed bag has proven to be easy to load and handle grace to the comparatively high flexibility. Still it is strong, puncture resistant and durable such that it may be used for shipping comparatively heavy goods as well as items which have comparatively sharp corners. The paper bag may thus advantageously be used for replacing both the hitherto predominantly used polybags and corrugated cardboard boxes.

The paper may further have one or more of the following properties;
- a tear index of at least 10.0, such as 10.0 to 14.0 $mNm^2/g$ in the MD and CD according to ISO 1974:2012
- a static friction coefficient of 0.40 to 0.60, such as 0.43 to 0.57 according ISO 15359:1999
- a puncture work index of 25 to 40, such as 27 to 39 $Jm^2/kg$ according to EN-14477
- a stretchability in the MD of 2.0 to 5.0%, such as 2.5 to 4.5% according to ISO 1924-3:2005
- a stretchability in the CD of 6.0 to 10.0%, such as 7.0 to 9.0 according to ISO 1924-3:2005.

In one embodiment, the CD of the paper is the same as the longitudinal direction of the bag. In such an embodiment, the TEA index (ISO 1924-3:2005) in the CD is of particular importance and preferably at least 2.5 J/g, such as at least 2.8 J/g.

In one embodiment, the MD stretchability is 2.0% to 3.5%, such as 2.0% to 3.0%, which means that it can be formed in a paper machine without a Clupak or an Expanda unit. In another embodiment, the MD stretchability is 3.5% to 5.0%, such as 4.0% to 5.0%, which means that it can be formed in a paper machine with a Clupak or an Expanda unit.

Several of the properties above are presented as indexes. All the indexes above except the bending resistance indexes are obtained by dividing the value obtained by the relevant standard by the grammage (ISO536:2012). Bending resistance indexes are obtained by dividing the value obtained by the relevant standard by the cube of the grammage.

The virgin fibres of the paper are preferably kraft virgin fibres, i.e. virgin fibres obtained by kraft pulping.

In one embodiment, the paper is uncoated. The paper may comprise a hydrophobic size, such as rosin size, ASA and/or AKD. The paper may also comprise starch for improved strength.

The surface roughness of at least one side (normally the printing side) of the paper of the present disclosure may be 500 ml/min or lower, such as 200-500 ml/min or 200-450 ml/min, according to ISO 8791-2:2013. Such a relatively low surface roughness can be obtained by calendering the paper.

The paper is preferably a single layer paper.

The first closure means may comprise a first foldable flap portion, the tear means may comprise a first tear line and the means for reclosing may comprises a second flap portion.

The first and second flap portions may be arranged on one and the same foldable flap wherein the first tear line divide the foldable flap into the first and second foldable flap portions.

The paper bag may further comprise a handle portion with a handle, which handle portion is arranged to be torn off from the bag when the bag is opened.

At one embodiment the paper bag comprises;
- a first wall panel having two side edges and a bottom edge;
- a second wall panel having two side edges and a bottom edge; wherein
- the side edges and the bottom edge of the first wall panel are joined to the corresponding side edges and bottom edge of the second wall panel leaving an opening between the first and second wall panel; and wherein
- at least one of the wall panels comprises an upper handle portion provided with a handle; the bag further comprising
- a first tear line extending from one side edge to the other and arranged between the handle portion and the bottom edge of said at least one wall panel for tearing of the handle portion;
- a first closure glue line extending between the side edges of at least one wall panel and arranged for first closure of the opening; and
- a second closure glue line extending between the side edges of at least one wall panel and arranged for second closure of the bag after tearing off the at least one upper handle portion.

The handle may be formed of a second tear line arranged in the handle portion for punching out a through hole handle. This allows for that the handle portion does not exhibit any through openings or tangling parts during the first shipment. This constitutes an advantage since such openings or tangling parts may hinder efficient handling of the bag during storage and transportation. The customer may then activate the handle at the pick-up location by punching out a handle hole defined by the second tear line. The so formed handle facilitates carrying the bag from the pick-up facility. Since the entire handle portion is removed when the bag is opened, the handle cannot hinder handling or transportation during return shipment.

The first and/or the second closure glue line(s) may be covered by a respective peel strip. In cases where the first glue line is covered by a peel strip, this peel strip is conveniently removed after first loading of the bag. The first glue line will thus not be exposed such as to cause premature closing of the bag or otherwise hinder first loading. When the second closure glue line is covered by a peel strip this peel strip is preferably removed after second loading of the bag for return shipment. The second closure glue line will thus not be exposed for hindering first loading, unloading or second loading. For facilitating use of the bag, the peel strips may exhibit a particular color, such as a bright color, e.g. red. This will alert the personnel loading and first closing the bag as well as the end customer that the peel strip should be removed for allowing first and second closure. It is also possible that the color of peel strip covering the first glue line differs from the color of the peel strip covering the second glue line. Alternatively or in combination, instructions of how to use the peel strips may be printed on them.

The bag may comprise at least two first closure glue lines which are covered by a single peel strip and/or at least two second closure glue lines, which are covered by a single peel strip. In some cases, it may be desirable to use double or more glue lines for effecting the first and or second closing of the bag. Such multiple glue lines may e.g. increase the strength of the closure. If a single peel strip is used for covering several or all of the first and second glue lines respectively, activation of the respective glue lines is facilitated since it then suffices to peel off only one peel strip for enabling closing the bag. This may be particularly beneficial for the personnel engaged in the first closing of the bag since these personnel often loads and closes several hundreds of bags in one day. It is thus preferable that at least the first closure glue lines are covered by a single glue strip.

The first and second wall panels may each comprise an upper handle portion provided with a handle and a first line of weakness for tearing off the handle portion. By this means a double panel handle portion will be formed which increases the strength of the handle portion.

When the first and second panels each comprise a first tear line, these first lines of weakness may be aligned. By this means the edges of new opening formed by tearing off the handle portions will run along one and another thereby to form an even opening.

Alternatively, the lines of weakness of the first and second wall panels may be arranged in parallel but not aligned. By this means, the remaining part of one of the wall panels, will after tearing off the handle portion be longer than the other. Such a relative extension of one of the wall panels may be provided with a second closure glue line for second closure of the bag. At second closure of the bag this relative extension may be folded over the opposing wall panel, thereby to form a strong fold over seal at the second closure.

The first and second panels may be formed by a single piece of paper. This allows for that the bag readily may be manufactured in a conventional paper converting machine and it also increases the strength of the bag.

The bottom edges of the first and second wall panels may be joined by means of a gusset portion. Hereby a completely sealed bottom of the bag is formed. The gusset bottom also increases the strength of the bag and allows for that the bag may stand by its own. This enhances the possibilities to use the bag for other purposes after (the first) opening the bag. If the bag should not be returned to the original sender, it may e.g. be used in the household as a trash bag, or for collecting and disposing compostable waste.

The side edges of the first and second wall panels may be joined by means of glue. This allows for a comparatively strong seal between the first and second wall panels. Preferably a biodegradable or recyclable glue is used, whereby the entire bag may be biodegradable or recyclable for saving the environment.

The glue for joining the side edges may for example comprise a dispersed starch-based adhesive, with or without PVA The first and/or the second closure glue line(s) may be formed on a respective foldable flap for creating a fold over seal at the first and/or second closure respectively. This allows for a strong first and/or second closure of the bag.

The first and/or the second closure glue lines may comprise a pressure sensitive adhesive, such as a cold-melt or hot-melt adhesive.

The first tear line may comprise a perforation and/or a line of reduced paper material and/or a tear strip and/or a tear string attached to the paper material.

The paper for forming the bag may be unbleached. This further reduces the environmental impact of the bag and may be appealing to the end consumers. The unbleached paper may for example have a stretchability (ISO 1924:3:2005) of 2.0% to 3.5%, such as 2.0% to 3.0%, in the MD.

At other embodiments the paper for forming the bag may be bleached. This enhances the printability of the paper such that the bag may readily be provided with information text, trademarks, decorations and other graphical elements. The unbleached paper may for example have a stretchability (ISO 1924:3:2005) of 3.5% to 5.0%, such as 4.0% to 5.0%, in the MD.

The bag according to the present disclosure may for example be used to ship and carry clothes, shoes, foodstuffs, electronics and household goods. Throughout the present disclosure, the first wall panel and the second wall panel may alternatively be referred to as a first main side and a second main side, respectively.

The gusset bottom may for example comprise a pair of subpanels folded along a gusset fold line. The two subpanels of the gusset may have a generally flattened "V" shape when the bag is in a collapsed state. Thus, in the collapsed stated of the bag, the gusset fold line may have an acute angle. In one expanded state of the bag, the gusset fold line may have an obtuse angle such that the gusset section is concave. In a further expanded state of the bag, the gusset fold line may have a more obtuse angle. Alternatively, at least one gusset section of the bag may be flat or substantially flat when the bag adopts one or more expanded states.

Since the bag may be substantially flat in a collapsed state, several empty bags may be stored and/or transported in a stack which is space saving. In the collapsed state of the bag, the thickness of the bag may substantially correspond to the sum of the thicknesses of the first wall panel and the second wall panel.

According to one example, a user (e.g. a worker at a retail store, e-tailer, distribution center and/or warehouse) may pick up a bag according to the present disclosure in a collapsed state, insert his/her hand into the bag through opening and spread his/her fingers within the bag to separate the first wall panel and the second wall panel such that the bag adopts a slightly expanded state. In this expanded state, the bag may be laid down or put standing on a horizontal surface, such as a desk, and the bag can be loaded with goods. This loading procedure is comfortable. In the first closed state, the bag may be shipped or may be handed over to a customer. In case the bag is handed over to a customer, the customer can carry the bag by means of the handle.

A bag according to the present disclosure may have a longitudinal length, in a direction between the bottom edge and the opposite upper edge, and a width (e.g. in a collapsed state of the bag), in a direction between the longitudinal side edges, and wherein the length of the bag is greater than the width of the bag. Thus, the bottom and upper edges may constitute short sides of the bag and the side edges may constitute long sides of the bag. In this case, the bag may have an appearance similar to a handbag. This type of bag may be used for shipping small garments, like underwear. Moreover, this type of narrow bag also helps centering of the mass in the bag.

Alternatively, the distance between the side edges may be longer than the distance between the bottom and top edges. Thus, the side edges may then constitute short sides of the bag and the upper and bottom edges may constitute long sides of the bag. In this case, when carrying the bag by means of the carrying handle, the bag is oriented horizontally, i.e. the bag has a vertical extension that is smaller than the horizontal extension.

The bag according to the present disclosure may be produced transversely to the web feeding direction of the converting machine. That is, the side edges of the bag may be arranged perpendicular to the feed direction. In this case, the first tear line and the first and second glue lines may be arranged in parallel with the feed direction.

Alternatively, the bag may be produced in parallel with the feed direction of the converting machine. That is, the side edges of the bag may be arranged in parallel with the feed direction. In this case, the first tear line and the first and second glue lines may be arranged perpendicular to the feed direction.

The bag according to the present disclosure may be produced at high machine speeds.

The present disclosure further provides a use of a paper as defined above for forming a paper bag as defined above.

The present disclosure also provides a use the paper bag defined above for e-commerce shipment of goods selected from the group consisting of clothes, shoes, foodstuffs, electronics and household goods.

BRIEF DESCRIPTION OF THE DRAWINGS

Further details, advantages and aspects of the present disclosure will become apparent from the following embodiments taken in conjunction with the drawings, wherein:

FIG. 1b is a plan view of the bag formed from the blank shown in FIG. 1a.

DETAILED DESCRIPTION

In the following, a paper bag according to the invention for receiving and containing goods will be described. The same reference numerals will be used to denote the same or similar structural features.

Figure 1A:
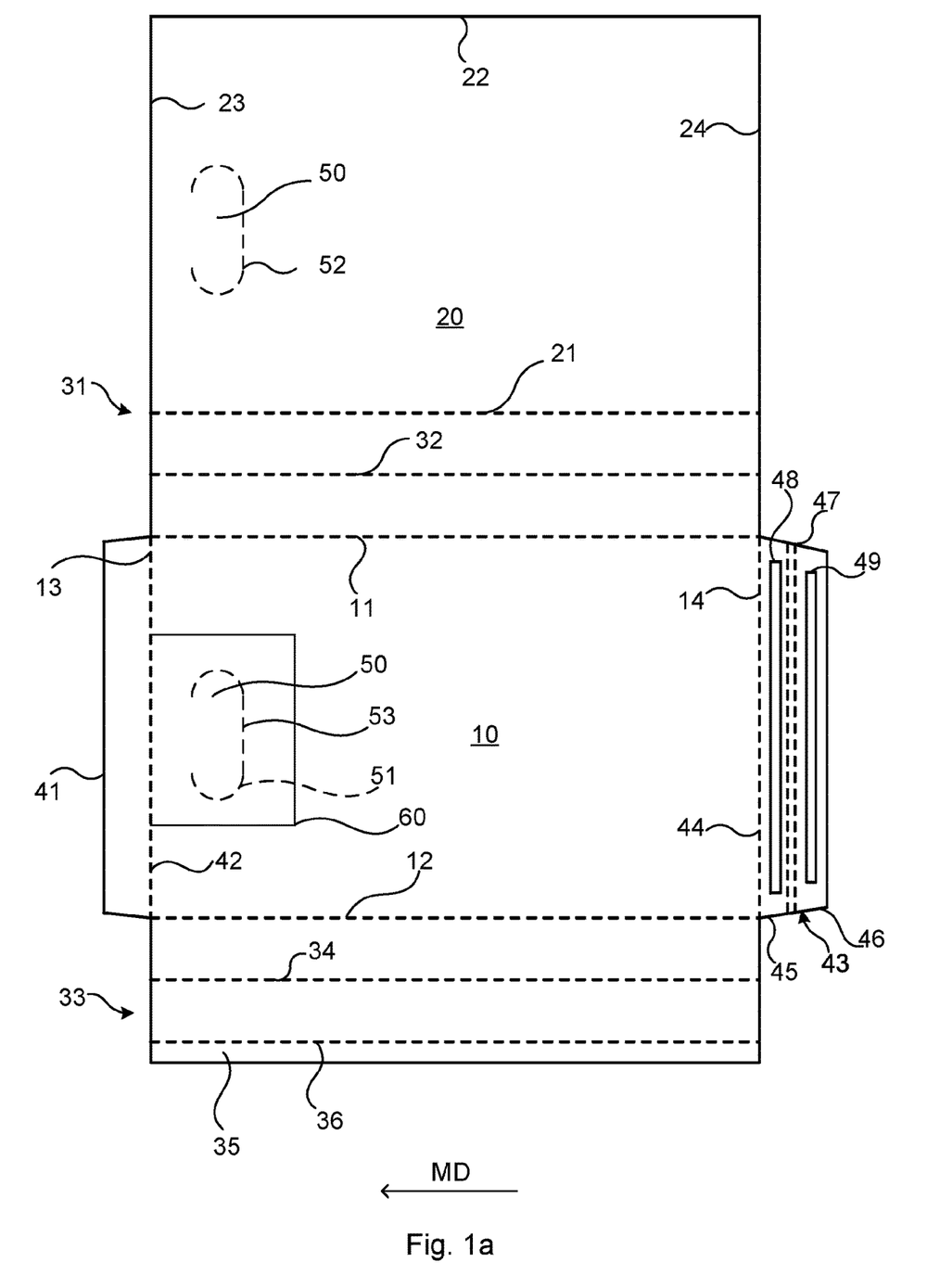
FIG. 1a is a plan view of a paper blank for forming a bag according to a first embodiment.
Figure 1B:
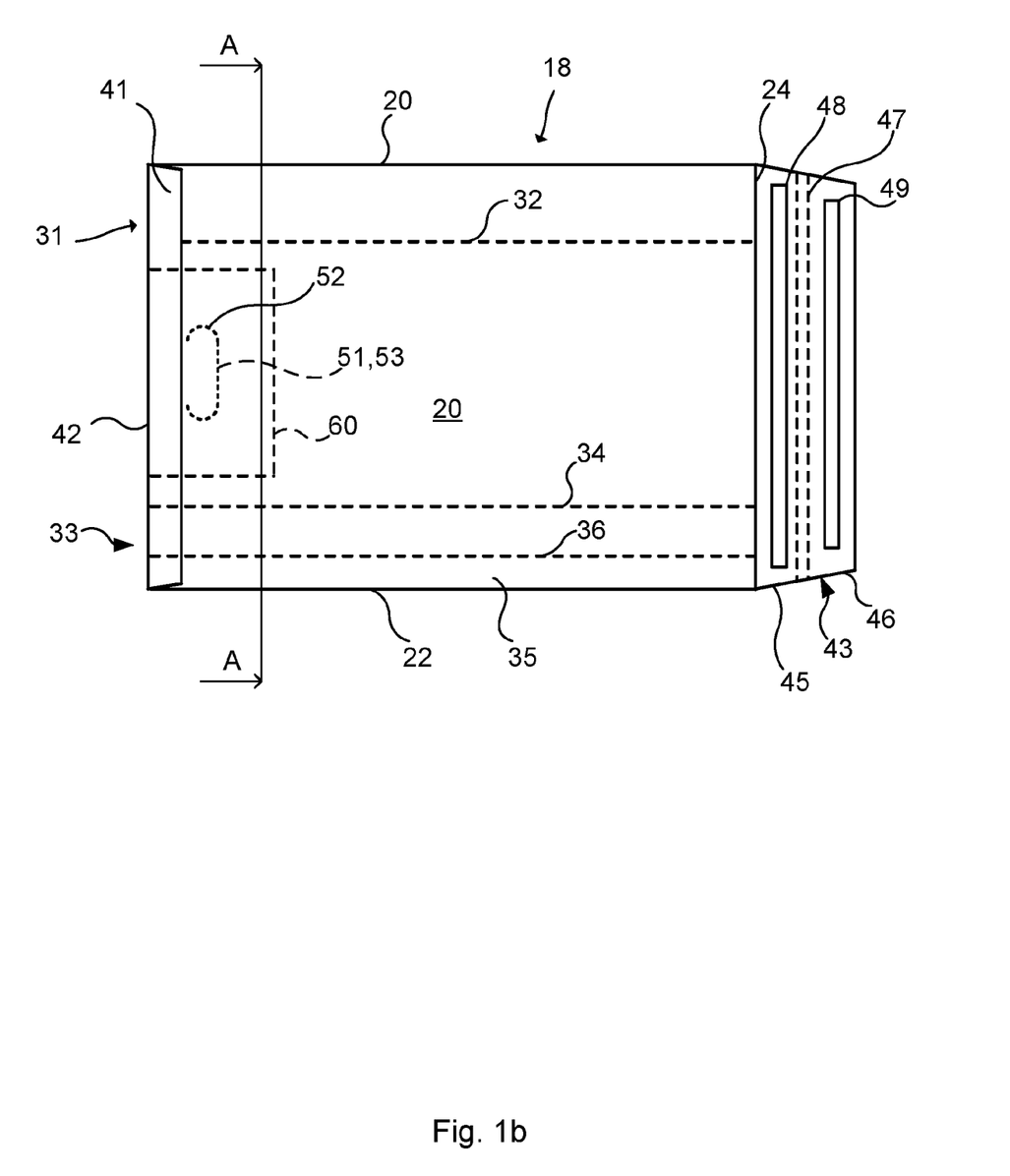
Figure 1C:
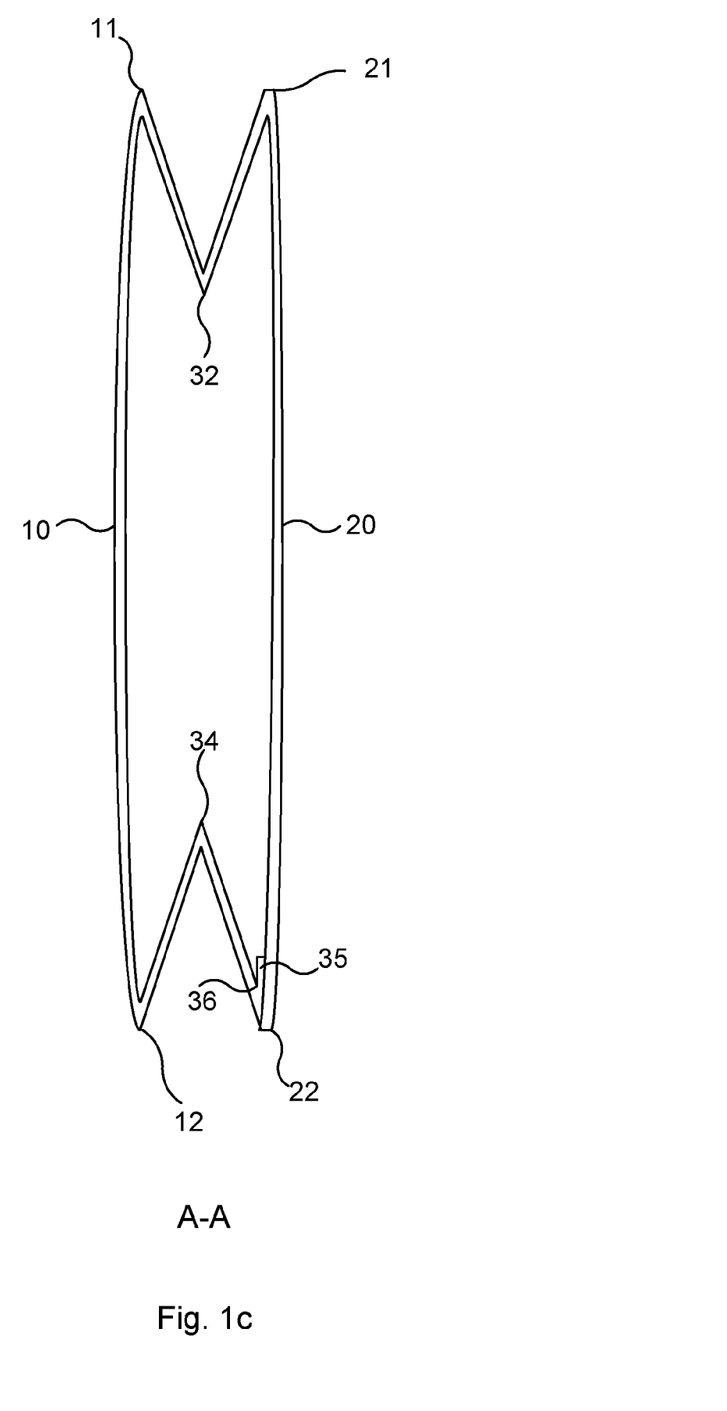
FIG. 1c is a cross section along line A-A in FIG. 1b.
Figure 1D:
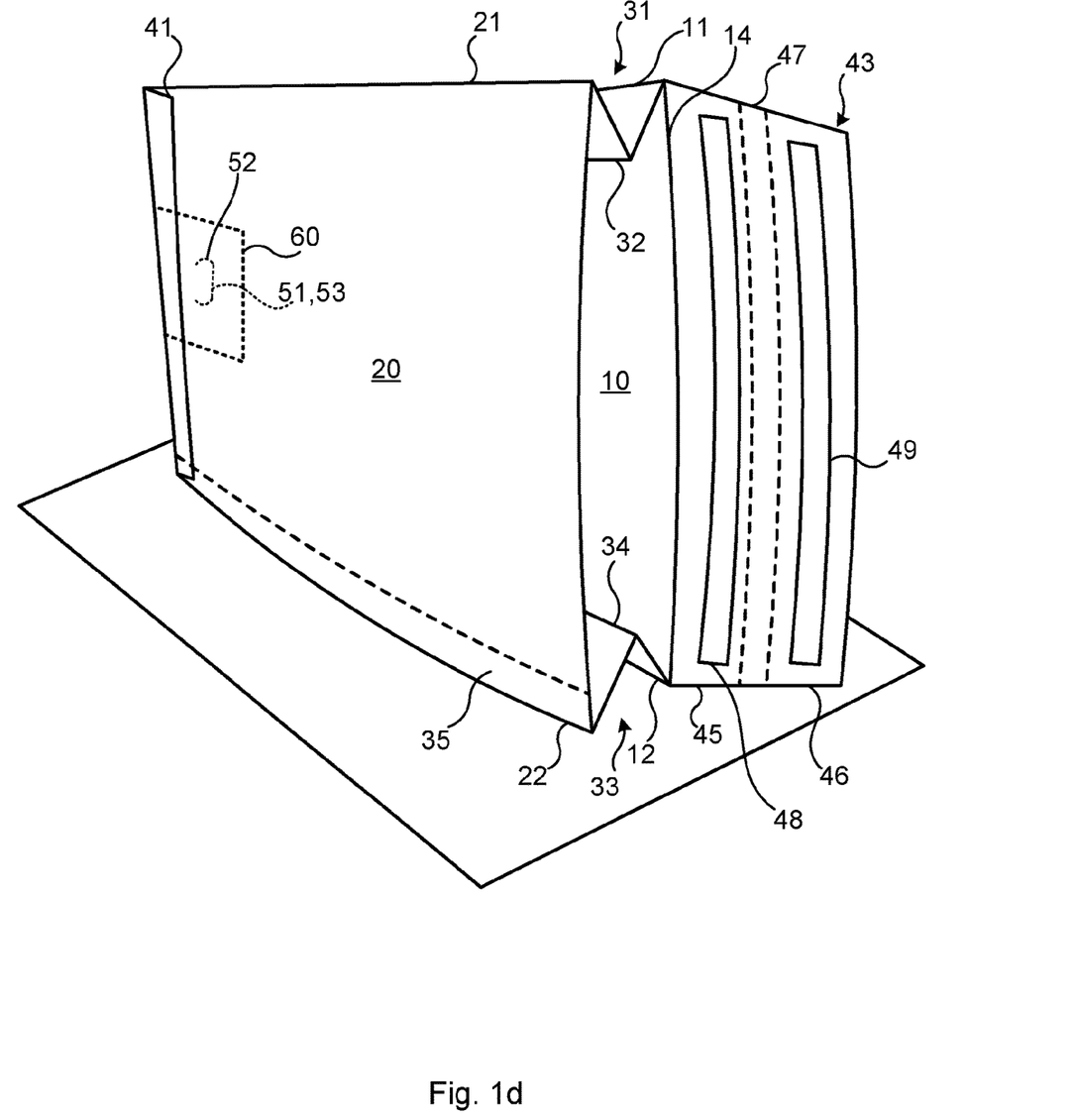
FIG. 1d is a perspective view of the bag shown in FIG. 1b.

FIG. 1a schematically represents a blank for forming the bag. However, as will be described further in detail below, when forming the bag in a paper converting machine, a web of paper material is fed in a feed direction from an upstream end to a downstream end of the machine. The web is continuously folded and glued into a tubular configuration which is thereafter cut generally transversely to the feed direction, thereby to form individual bags.

With reference to FIGS. 1a-d, the bag 10 comprises a first wall panel 10 with longitudinal side edges 11, 12, a first longitudinal end 13 and a second longitudinal end 14. A second wall panel 20 comprises longitudinal side edges 21, 22 a first longitudinal end 23 and a second longitudinal end 24.

Figure 3:
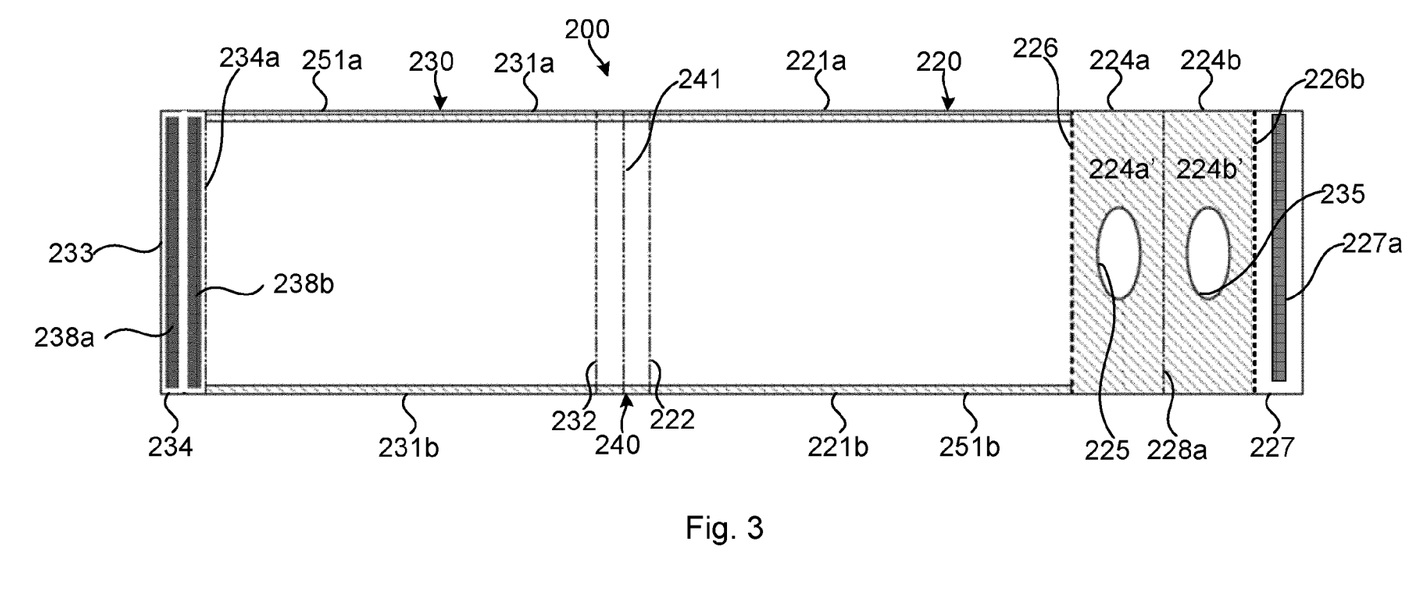
FIG. 3 is a plan view of a blank for forming a bag according to a third embodiment.

First longitudinal edges 11, 21 of the first 10 and second 20 wall panels are connected by means of a first gusset section 31, The first gusset section 31 comprises fold lines which extend along the first side edges 11, 21 and an intermediate fold line which extends centrally between the first side edges. Correspondingly, second side edges 12, 22 of the first 10 and second 20 wall panels are connected by means of a second gusset section 33. The second gusset section 33 is extended sidewise by a longitudinal glue flap 35 which extends in parallel with the second side edges 12, 22 and is connected to the second gusset section by a fold line 36. As best seen in FIG. 3 the glue flap 35 is adhered to the inside of an edge portion of the second panel 20, such that the glue flap's fold line 36 coincides with the second wall panel's second side edge 22. The second gusset section 33 thus comprises a fold line along the second side edge 12 of the first wall panel 10, the glue flap's fold line 36 and an intermediate fold line 34 extending centrally between fold lines 12 and 36.

By this means the first 31 and second 33 gusset sections exhibit a generally V-shaped configuration allowing these sections and the bag to be expanded and retracted to a generally flat configuration A first flap 41 is connected to the first end 13 of the first wall panel 10 by means of a fold line 42 extending in parallel with the first end 13. The first foldable flap 41 is provided with an adhesive (not shown) such that it may be folded over the second wall panel 20 and adhered to the outside of the second wall panel 20 for closing the first end of the bag 10. Normally, the first flap 41 is folded and permanently adhered to the second wall panel 20 already during manufacturing of the bag, in the paper bag converting machine. A second flap 43 is foldably connected to the second end 14 of the first wall panel 10 by means of a fold line 44. The second foldable flap 43 exhibits a proximal portion 45 and a distal portion 46 which is connected to the proximal portion 45 by means of a tear strip 47. In the shown example the tear strip 47 is formed by two lines of perforations extending in parallel with fold line 14. The proximal 45 and distal 46 portions are each provided with an adhesive 48, 49 covered by a respective peel strip (not shown).

At a first closing of the bag the peel strip covering the adhesive 49 on the distal portion may be removed, the second foldable flap folded over the second wall panel 20 and the distal portion 46 adhered to the outside of the second panel. The bag may thereafter be opened by tearing the tear strip 47 thereby releasing the proximal portion 45 but leaving the distal portion adhered to the second panel 20. For re-closing the bag, the peel strip covering the adhesive 48 on the proximal portion is removed and this portion is folded over the second wall panel 20 and adhered to its outside.

At not shown alternatives the tear strip 47 may be replaced by other tear lines such as a single perforated line, a line of reduced material thickness, a pull string attached to the paper or combinations thereof.

In the shown example, the bag 10 is further provided with first handle-forming cuts 51, 52 arranged in the first 10 and second 20 wall panels. The first cuts 51, 52 are positioned centrally in the respective wall panel and in proximity to the first ends 13, 23. The first cuts 51, 52 are identical and aligned.

In the shown example each first cut 51, 52 comprises a tearable perforation. The cuts are generally C-shaped such that they define a handle zone 50 but does not completely surround the handle zone 50 circumferentially. Thus, in use, the handle is not formed until the perforation is torn by applying pressure to the handle zone 50, from either side of the bag. By this means the handle zone 50 remains integral with the wall panels 10, 20 e.g. during transportation to the goods loading cite, loading and shipping to the end consumer. This provides for that the handle does not interfere with such handling of the bag.

When the first cuts 51, 52 have been torn and the handle has been formed by the creation of a handle opening through the first 10 and second 20 wall panels, the handle zone remains connected to the bag 10. This is achieved by the non-perforated portion of the handle zone's circumference. This non-perforated portion forms a fold line or a hinge such that the handle zone 50 may be folded to overlap the wall panels, thereby increasing the strength of the bag in proximity to the handle.

According to a not shown embodiment, the first cuts may completely surround the handle zone circumferentially such that the material of the handle zone is completely removed when the cuts are torn. According to a further not shown embodiment the first cuts are continuous die-cuts instead of perforations such that the handle is formed when producing the bag. Such die-cuts may or may not completely surround the handle zone circumferentially. In a further not shown embodiment, non-perforating lines of weakness are used instead of die-cuts or perforations.

The bag further comprises a reinforcement patch 60 which is arranged to reinforce the bag 10 at the area surrounding the handle, thereby increasing the strength of the handle and allowing a greater weight to by carried in the bag, by means of the handle.

In the shown example, the reinforcement patch 60 comprises a rectangular piece of paper. The paper may be of the same sort and quality as the paper forming the other parts of the bag 10. However, the reinforcement patch may alternatively be formed of another sort and quality of paper or of another material such as of polymer material.

The reinforcement patch 60 is adhered to the inside of both the first 10 and the second 20 wall panel at a position such that it fully overlaps the first cuts 51, 52 forming the handle. Preferably the reinforcement patch also extends somewhat beyond the first cuts 51, 52 in both longitudinal and transverse directions of the bag. Especially, it is advantageous if the reinforcement patch extends in the longitudinal direction from the first cuts all the way to the first end 13, 23 of the first and second wall panels 10, 20. The area between the first cuts and the first end 13, 23 is arranged above the handle in use and is thus exposed to comparatively great forces and shear stress.

Preferably however, the reinforcement patch 60 does not extend onto the first foldable flap 41, since this would complicate the manufacturing of the bag and adversely increase the thickness of the first end of the bag when the first foldable flap 41 has been folded over for closing the first end of the bag.

At the shown example a handle-forming second cut 53 is arranged in the reinforcement patch 60. The second cut also comprise a tearable perforation and has shape and position which fully corresponds to the first cuts 51, 52 such that the second cut 53 is fully aligned with the first cuts 51, 52. By this means the formation of a uniform handle is facilitated.

At an alternative embodiment, which is not shown, the second cut is instead die-cut and at a further alternative no second cut is arranged in the reinforcement patch. It this later alternative the first cuts are sufficient for tearing the material of the wall panels and the intermediate reinforcement patch. As for the first cuts, the second cut in the reinforcement patch may be replaced by at least one non-perforating line of weakness.

However, it is advantageous if the first 51, 52 and second 53 cuts are identical since they may then be simultaneously formed by a single die-cut or perforation tool in the paper converting machine, at a position downstream of the tube forming station.

At some applications, such as when the bag is intended to be sent directly to the home of the end customers, the handle portion and the reinforcement patch may be omitted.

At the embodiment shown in FIGS. 1a-d the paper forming the blank is an unbleached paper having the following properties:
Grammage 90 g/m$^2$
Tensile index in the MD 104 Nm/g
Tensile index in the CD 60 Nm/g
TEA index in the MD 2.0 J/g
TEA index in the CD 3.0 J/g
Bending resistance index in the MD 249 Nm$^6$/kg$^3$
Bending resistance index in the CD 101 Nm$^6$/kg$^3$
Puncture force index 94 Nm$^2$/kg
Burst index 5.7 kPam$^2$/g
Virgin kraft fibre content 100%
Soft wood content 100%
Tear index in the MD 11.0 mNm$^2$/g
Tear index in the CD 13.0 mNm$^2$/g
Static friction coefficient 0.43
Puncture work index 29 Jm$^2$/kg
Stretchability in the MD 2.6%
Stretchability in the CD 70.0%

Figure 2A:
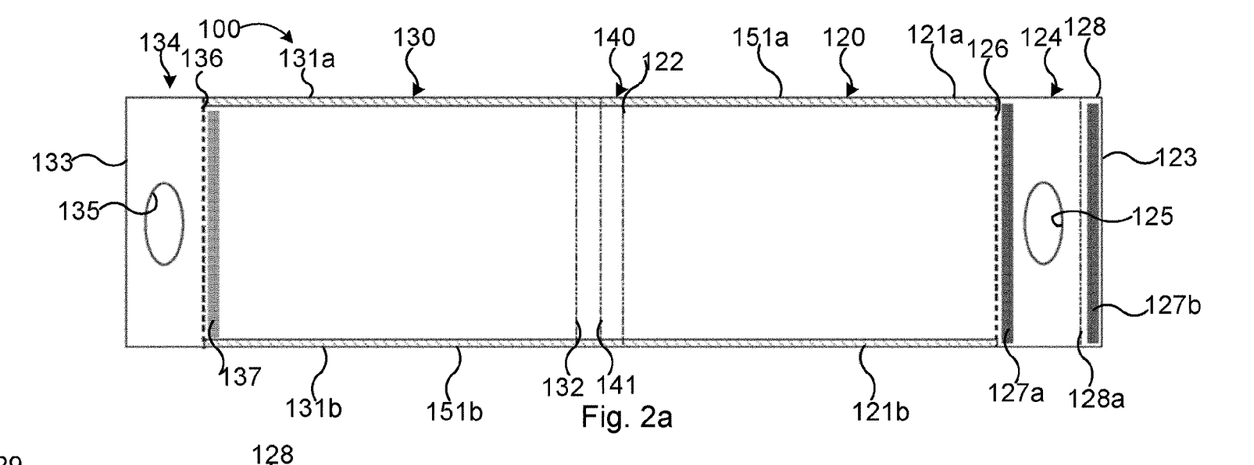
FIG. 2a is a plan view of a blank for forming a bag according to a second embodiment.

FIG. 2a illustrates a paper blank 100 for forming a paper bag according to a second embodiment. The paper blank 100 is formed of a single piece of a paper material. The blank 100 comprises a first wall panel portion 120 and a second wall panel portion 130. Each first 120 and second 130 wall panel portions exhibits respective side edges 121a, 121b, 131a, 131b, a respective bottom edge 122, 132 and a respective top edge 123, 133. The bottom edges 122, 132 constitute respective fold lines which are joined by means of a gusset bottom portion 140 which comprises a gusset fold line 141 arranged centrally between the bottom edges 122, 132.

The first wall panel portion 120 comprises a first handle portion 124 which is arranged distal to the bottom edge 122 and the second wall panel portion 130 comprises a second handle portion 134, which is arranged distal to the bottom edge 132. The first handle portion 124 is connected to the remainder of the first wall panel portion 124 by means of a first tear line 126 which extends from one side edge 121a to the other side edge 121b. Correspondingly the second handle portion 134 is connected to the remainder of the second wall panel portion 130 by means of a first tear line 136. In the shown example the first tear lines 126, 136 are formed as perforations through the paper material. At a not shown alternative, the first tear lines may comprise a line of reduced paper material thickness, a tear string, i.e. a piece of string or tape attached to the paper for tearing the paper along the string or tape or similar tear open means. It may also comprise a tear strip with two parallel perforation lines. It is also possible that the first tear lines comprise a combination of a perforation and/or a tear strip and/or a line of reduced material thickness with a tear string.

In the shown example the first 124 and second 134 handle portions each exhibit a cut-out handle 125, 135. The cut-out handles are arranged such that they are aligned when the first 120 and second 130 wall panel portions have been folded one onto the other for forming the bag. In an alternative, not shown, variant the handle portions 124, 134 may comprise a single or several tear lines for punching out a respective handle by breaking the tear lines. The tear lines may be formed by perforations, by lines of reduced material thickness or by other means.

The first handle portion 124 further exhibits two first closure glue lines 127a, 127b. Both first closure glue lines extend in parallel with the first tear line 126 and the top edge 123 of the first wall panel portion 120. One first closure glue line 127a is arranged in proximity to the first tear line 126 and the other first closure glue line 127b is arranged at a foldable first closure flap 128 which is formed in proximity to the top edge 123 of the first wall panel portion and which is connected to the remainder of the first handle portion 124 by means of a fold line 128a. The fold line 128a is arranged at a distance from the first wall panel portions' first tear line 126, which corresponds to the distance between the second wall panel portions' 130 first tear line 36 and top edge 133. The first closure glue lines 127a, 127b may be covered by respective peel strip (not shown). In this embodiment however both first glue lines 127a, 127b are covered by a single peel strip 129 (see FIG. 2b).

The second wall panel portion 130 further exhibits a second closure glue line 137 which extends in parallel with the top edge 133, from one side edge 131a to the other side edge 131b. The second closure glue line 137 is arranged adjacent the first tear line 136 on that side of the first tear line 136 which is distal to the second handle portion 134. The second closure glue line 137 is covered by a peel strip (not shown) for preventing the second glue line 137 to adhere to any part of the bag or any other item before it has been activated for second closure by peeling off the peel strip.

The first 127a, 127b and second 137 glue lines comprise a pressure sensitive adhesive which may comprise e.g. a hot-melt or cold-melt adhesive.

At the shown example, the second handle portions' 134 first tear line 136 is arranged at a distance from the gusset fold line 141 which is somewhat greater than the distance between the first handle portions 124 first tear line 26 and the gusset fold line 141. These distances differ essentially by the width of the second glue line 137. By this means the first tear line 126 of the first wall panel portion 120 will not be aligned with the first tear line 136 of the second wall panel portion 130, as will be explained more in detail below.

The gusset portion 140, the first wall panel portion 120 and the second wall panel portion 130 are provided with glue strips 151a, 151b which extend along respective side edges 121a, 121b, 131a, 131b from the first tear line 126 of the first wall panel portion 120 to the first tear line 136 of the second wall panel portion. The glue strips 151a, 151b comprises a water-dispersed starched-base adhesive. When one wall panel portion is folded onto the other wall panel portion for forming the bag, respective portions of the glue strips 151a, 151b will contact one and the other to thereby connect the first wall panel portion 120 to the second wall panel portion 130 along the side edges 121a, 121b, 131a, 131b, from the gusset fold 141 to the first tear line 136 of the second wall panel portion 130. At an alternative, not shown embodiment glue strips are arranged along the side edges from the gusset fold 141 only in one direction to the first line of weakness of the first wall panel or the second wall panel. In such cases the first and second wall panels are connected by means of a glue strip applied to one of the wall panel portions and making contact with the paper along the side edges of the other wall panel portion.

Figure 2B:
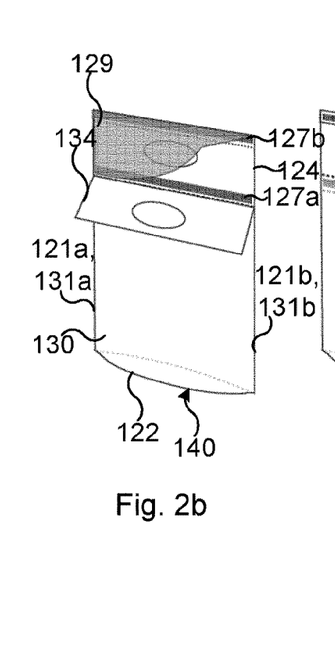
FIGS. 2b-g are perspective views of the bag formed of the blank shown in FIG. 2a and illustrate different stages of use of the bag.
Figures 2C, 2D:
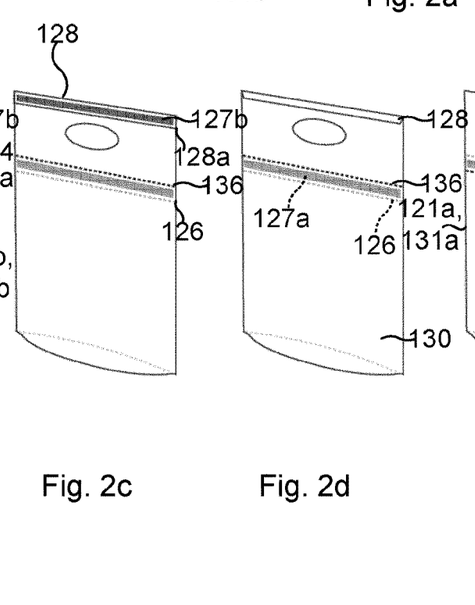

FIGS. 2b and 2c shows the bag after it has been formed from the blank shown in FIG. 2a, in a paper converting machine. In both figures the bag is shown before a first closure of the bag. In FIG. 2b the second handle portion 134 has been folded down for showing the inside of the first handle portion 124. The bag comprises a first wall panel 120 (see FIG. 2e) and a second wall panel 130 which are connected along respective side edges 121a, 131a, 121b, 131b. The wall panels 120, 130 comprises respective bottom edges 122, 132 which are mutually connected by means of a bottom gusset portion 140. Both first glue lines 127a, 127b are covered by the single peel strip 129.

When loading the bag with goods, the first 124 and second 134 handle portions may be erected as shown in FIG. 2c or folded outwards or downwards along the respective first tear line 126, 136, as the second handle portion shown in FIG. 2b. Access into the bag is achieved by separating the two wall panels 120, 130 from each other, at least at an upper portion of the wall panels. Thereby, the opening defined by the first 120 and second 130 wall panels at the region in proximity to the first tear lines is widened such as to allow insertion of goods through the opening into the bag.

Thereafter the peel strip 129 is removed for simultaneously activating both first glue lines 127a, 127b. Both handle portions 124, 134 are then folded upwards and pressed together whereby the lower first glue line 127a will contact the second handle portion and permanently close and seal the opening. Thereafter, the foldable first closure flap 128 may be folded and pressed onto the outside of the second handle portion 134 whereby the upper edges of the first 120 and second 130 wall panels are permanently connected by a fold seal to form a single handle portion of the bag. At an alternative, not shown embodiment the upper extended first closure flap 128 may be omitted such that the upper edges of the first and second wall panels are aligned. The upper first glue line may then be arranged just below the upper edge of the first wall panel such that a fin seal is formed when the handle portions are pressed together.

Figure 2E:
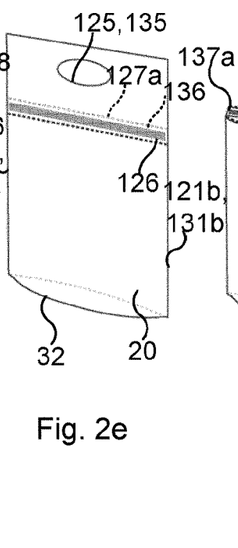

The so closed bag is shown in FIGS. 2d and 2d which show the bag from opposite sides. In FIG. 2d the first glue line 127a and the first tear line 126 of the first wall panel are illustrated as seen through the second wall panel 130. In FIG. 2e the first glue line 127a and the first tear line 136 of the second wall panel 130 are illustrated as seen through the first wall panel 120.

When closed in this manner the bag may be shipped, e.g. to a pick-up facility where it may be collected by a customer. The customer may then conveniently grip the overlapping cut-out handles 125, 135 for carrying the bag from the pick-up facility. In cases when the handles are instead defined by perforations or other lines of weakness, the customer may activate the handle by punching out the areas of the first and second handle portions defined by the second lines of weakness.

For opening the bag, the first tear lines 126, 136 of the first 120 and second 130 wall panels are broken by tearing of the handle portions 124, 134 from the remainder of the bag. Since the first 124 and second 134 handle portions are permanently connected by means of the first glue lines 127a, 127b, this is readily done by gripping the joined handle portion and tearing, whereby both first tear lines 126, 136 are simultaneously broken.

Figures 2F, 2G:
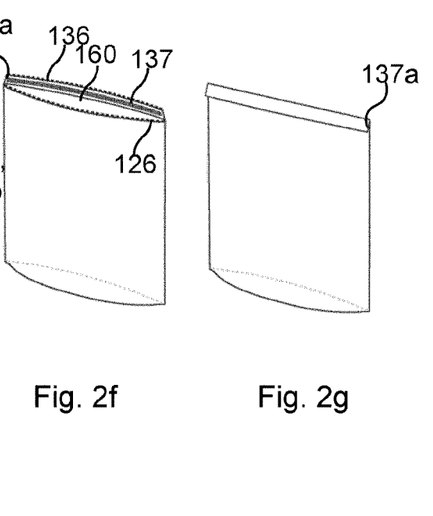

A new opening 160 is then formed between the so formed new upper edges which are created by the torn first tear lines 126, 136 and the contents of the bag may be unloaded though the new opening 160.

If the customer now wants to return some of the contents to the original sender or use the bag for shipping any item to any other receiver, the same bag may conveniently be used for such second shipment. After loading the goods to be shipped through the new opening 160 the bag may readily be closed and sealed by first peeling off the peel strip (not shown) covering the second closure glue line 137. At the shown example and as described above, the first tear line 136 of the second wall panel 130 is not aligned with the first tear line 126 of the first wall panel 120. Instead the second wall panel's first tear line 136 is arranged at greater distance from the bottom edge of the bag than the first tear line 126 of the first wall panel 120. Hereby, a foldable second closure flap 137a is formed when tearing the first tear lines 126, 136. Further, the second glue line 137 is arranged at this foldable second closure flap 137a.

The bag may thus be readily closed a second time by folding the second closure flap 137a around the new upper edge 126 of the first wall panel 120 and press it against the outside of the first wall panel 120. By this means the new opening 160 has been permanently closed by a fold seal and the bag may be used for a further shipment. The bag reclosed in such a manner is illustrated in FIG. 2g.

At an alternative where the first tear lines are aligned and the second closure glue line is arranged adjacent the first tear line of either the first or the second wall panel, the second glue line may be pressed against the inside of the other wall panel. Thereby the new opening is closed and sealed by a fin seal which also allows the bag to be shipped a second time.

In cases when the customer does not want to use the bag for return or any other further shipment it has proven that the bag may be used for many other purposes. For example, the gusset bottom provides a completely sealed bottom which also allows the bag to stand alone. This makes the bag suitable to use e.g. as a trash bag or for collecting and disposing compostable waste in the household.

At the embodiment shown in FIG. 2a-g the paper forming the blank is a bleached paper having the following properties:

Grammage 120 g/m$^2$
Tensile index in the MD 95 Nm/g
Tensile index in the CD 59 Nm/g
TEA index in the MD 2.4 J/g
TEA index in the CD 30.1 J/g
Bending resistance index in the MD 125 Nm$^6$/kg$^3$
Bending resistance index in the CD 83 Nm$^6$/kg$^3$
Puncture force index 108 Nm$^2$/kg
Burst index 5.4 kPam$^2$/g
Virgin kraft fibre content 100%
Soft wood content 100%
Tear index in the MD 12.0 mNm$^2$/g
Tear index in the CD 13.0 mNm$^2$/g
Static friction coefficient 0.52
Puncture work index 38 Jm$^2$/kg
Stretchability in the MD 4.3%
Stretchability in the CD 8.0%

FIG. 3 illustrate a blank 200 for forming bag according to a third embodiment. The blank 200 comprises a first wall panel portion 220 and a second wall panel portion 230 which are connected by means of a gusset portion 240 extending between respective bottom edges 222, 232 of the wall panel portions and exhibiting a central gusset fold line 141.

The first 220 and second 230 wall panel portions exhibit side edges 221a, 221b, 231a, 231b which are provide with glue strips 251a, 251b for connecting the first 220 and second 230 wall panel portions.

The first wall panel portion 220 comprises a first handle portion 224a and a second handle portion 224b. The first handle portion 224a is arranged closer to the first wall panels portion's bottom edge 221 than the second handle portion 224b. The first handle portion 224a is connected to that portion of the first wall panel portion which is arranged between the bottom edge 222 and the first handle portion 224a by means of a first tear line 226a. Said first tear line 226a extends from the first side edge 221a to the second side edge 221b. The second handle portion 224b is connected to the first handle portion 224 by means of a handle portion fold line 228a which extends in parallel with said first tear line 226a. A first closure flap 227 is connected to the second handle portion 224 by means of a further first tear line 226b which extends in parallel with the handle portion fold line 228a and the first tear line 226a. The first closure flap is provided with a first closure glue line 227a which is covered by a peel strip (not shown).

The first 224a and the second 224b handle portions exhibits cut out handles 225, 235 which are aligned when the second handle portion 224b has been folded onto the first handle portion 224a. As discussed previously the cut out handles could be replaced by second tear lines for defining punch-out handles.

At least one and in the example shown both of the first 224a and second 224b handle portions are provided with glue fields 224a', 224b'.

A second closure flap 234 is connected to the free end of the second wall panel 230 by means of a second closure flap fold line 234a. The second closure flap 234 provided with a two second closure glue lines 238a, 238b which extends between the first 231a and second 231b side edges and which is covered by a peel strip (not shown).

At this embodiment the glue strips 251a, 251b extend from the second closure flap fold line 234a of the second wall panel portion 230 to the first tear line 226a of the first wall panel portion 220.

When forming the bag, the first 220 and second 230 wall panel portions are folded onto one and another such that corresponding portions of the glue strips 251a, 251b make mutual contact thereby to connect the side edges 221a, 221b, 231a, 231b of the first 220 and second 230 wall panel portions. Additionally, the second handle portion 224b is folded over the handle portion fold line 228a and is pressed against the first handle portion 224a such that the first 224a and second 224b handle portions are permanently connected by means of the glue fields 224a', 224b'. At this folding operation, the first closure flap 227 of the first wall panel portion is left to be freely folded about the first closure flap fold line 227a. The first 224a and second 224b handle portions are of the same size such that both first tear lines 226a, 226b are aligned when the handle portions 224a, 224b are folded one onto the other.

In the shown example both handle portions 224a, 224b are entirely covered by glue fields 224a', 224b'. Just as for the glue strips 251a, 251b it may however be sufficient that only one of the handle portions exhibits a glue filed. Additionally, the entire handle portion need not to be covered by glue. It may suffice that glue is applied to only a portion of one or two handle portions. However, it is preferable that the glue for joining the handle portions seals the bag such that foreign matter cannot enter the bag after first closure. That may be achieved e.g. by applying a glue strip on one of the handle portions, which glue strip extends adjacent and in parallel with the first line of weakness from one side edge to the other.

After so connecting the first 220 and second 230 wall panels, the bag may be initially loaded through an opening which is formed generally between the aligned first tear line 226a, 226b and the second closure flap fold line 238b. This opening may be widened by separating the first 220 and second 230 wall panels at a corresponding region.

For first closure of the bag, the second closure flap 234 is folded about second closure flap fold line 234a and inserted into the bag, between the first 220 and second 230 wall panels. Thereafter the peel strip (not shown) covering the first closure glue line 227a is removed and the first closure flap 227 is folded about first tear line 226 such that the first closure flap 227 overlaps the outside of the second wall panel 230. By pressing the first closure flap 227 against the outside of the second wall panel 230, the first closure flap glue line 227 is adhered to the outside of the second wall panel, whereby the bag is closed a first time.

For opening the bag, the connected handle portions 224a, 224b are gripped and torn off from the remainder of the bag. The first tear lines 226a, 226b are then simultaneously broken such that the handle portions 224a, 224b are removed as a single piece. While the first closure flap 227 remains attached to the second wall panel 230, a new opening arranged between the broken first tear lines 226a, 226b is formed in this manner.

For second closure of the bag, the second closure flap 234 is folded out from the inside of the bag, the peel strip (not shown) covering the second closure glue lines 238a, 238b is removed and thereafter the second closure flap 234 is folded onto the outside of the upper portion of the first wall panel 220 and fixed thereto by means of the second closure glue lines 238a, 238b.

At the embodiment shown in FIG. 3 the paper forming the blank is an unbleached paper having the following properties:
Grammage 100 g/m$^2$
Tensile index in the MD 104 Nm/g
Tensile index in the CD 60 Nm/g
TEA index in the MD 2.0 J/g
TEA index in the CD 2.8 J/g
Bending resistance index in the MD 260 Nm$^6$/kg$^3$
Bending resistance index in the CD 140 Nm$^6$/kg$^3$
Puncture force index 102 Nm$^2$/kg
Burst index 5.82 kPam$^2$/g
Virgin kraft fibre content 100%
Soft wood content 100%
Tear index in the MD 12.0 mNm$^2$/g
Tear index in the CD 13.0 mNm$^2$/g
Static friction coefficient 0.47
Puncture work index 31.3 Jm$^2$/kg
Stretchability in the MD 2.6%
Stretchability in the CD 70.0%

Figure 4:
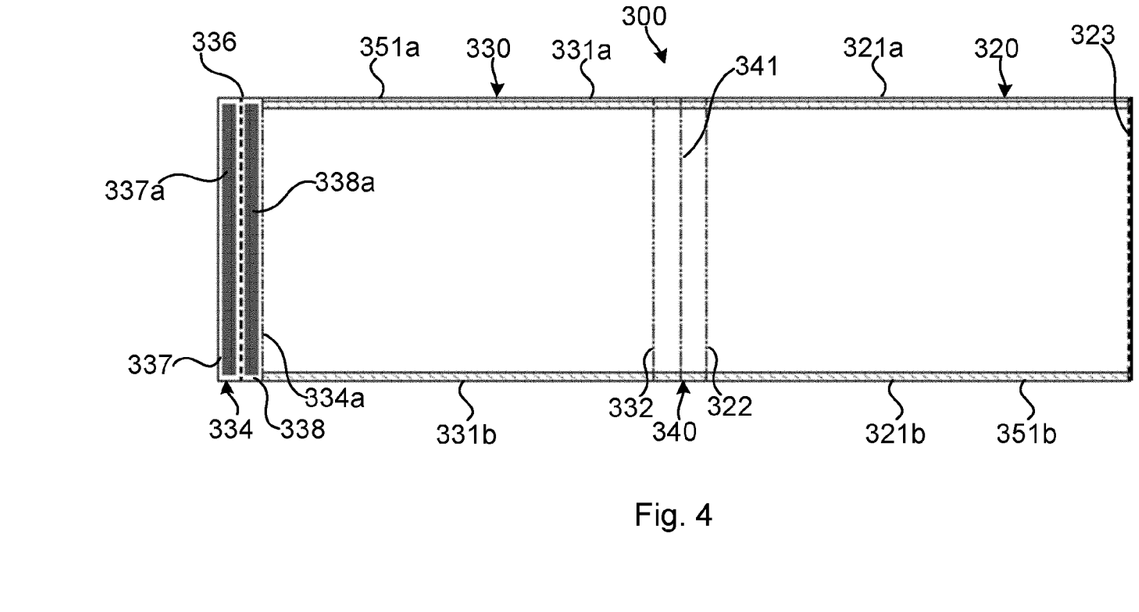
FIG. 4 is a plan view of a blank for forming a bag according to a fourth embodiment.

FIG. 4 illustrates a blank 300 for forming bag according to a fourth embodiment. The blank 300 comprises a first wall panel portion 320 and a second wall panel portion 330 which are connected by means of a gusset portion 340 extending between respective bottom edges 321, 332 of the wall panel portions and exhibiting a central gusset fold line 341.

The first 320 and second 330 wall panel portions exhibit side edges 321a, 321b, 331a, 331b which are provide with glue strips 351a, 351b for connecting the first 220 and second 230 wall panel portions. The first wall panel portion 320 comprises an edge 323 which is arranged in parallel with and distal to the bottom edge 322.

The second wall panel portion 230 is connected to a closure flap 334 by means of a common first and second closure fold line 334a. The closure flap 334 comprises a first closure flap portion 337 and a second closure flap portion 338 which are connected by means of a first tear line 336. The first closure flap is provided with a first closure glue line 337a and the second closure flap portion 338 is provided with a second closure glue line 338a. The first 337a and second 338a closure glue lines are covered by a respective peel strip (not shown).

When forming the bag, the first 320 and second 330 wall panel portions are folded onto one and another such that corresponding portions of the glue strips 351a, 351b make mutual contact thereby to connect the side edges 321a, 321b, 331a, 331b of the first 320 and second 330 wall panel portions.

The so formed bag may readily be closed a first time after loading by removing the peel strip (not shown) covering the first closure glue strip 337a and folding the closure flap 234 about the first closure fold line 334a such that the closure flap 334 overlaps the outside of the first wall panel 320, thereby enclosing the free edge 323 of the first wall panel 320. Thereafter the first closure glue line is pressed against the outside of the first wall panel 320 such that the first closure panel portion 337 is adhered thereto, thereby closing the bag.

After such first closure of the bag it may be opened by tearing the first tear line 336 and unfold the second closure flap 338.

Second closure is readily achieved by removing the peel strip (not shown) covering the second closure glue line 338a and folding the second closure flap portion 388 about the first and second closure fold line 334a such that the second closure flap portion 334 overlaps the outside of the first wall panel 320, thereby again enclosing the free edge 323 of the first wall panel 320. Thereafter the second closure glue line 338a is pressed against the outside of the first wall panel 320 such that the second closure panel portion 338 is adhered thereto, thereby closing the bag a second time.

At the embodiment shown in FIG. 4 the paper forming the blank is a bleached paper having the following properties:
Grammage 90 g/m$^2$
Tensile index in the MD 95 Nm/g
Tensile index in the CD 59 Nm/g
TEA index in the MD 2.3 J/g
TEA index in the CD 3.0 J/g
Bending resistance index in the MD 132 Nm$^6$/kg$^3$
Bending resistance index in the CD 95 Nm$^6$/kg$^3$
Puncture force index 95 Nm$^2$/kg
Burst index 5.7 kPam$^2$/g
Virgin kraft fibre content 100%
Soft wood content 100%
Tear index in the MD 11.5 mNm$^2$/g
Tear index in the CD 12.5 mNm$^2$/g
Static friction coefficient 0.53
Puncture work index 31 Jm$^2$/kg
Stretchability in the MD 4.3%
Stretchability in the CD 8.0%

While the present disclosure has been described with reference to exemplary embodiments, it will be appreciated that the present invention is not limited to what has been described above. Although the bag may be produced with the dimension ratios presented in the drawings, it will be appreciated that the dimensions of the parts may be varied as needed. Accordingly, it is intended that the present invention may be limited only by the scope of the claims appended hereto.

The invention claimed is:

1. A paper bag for e-commerce shipments, which paper bag comprises first closure means for first closure of the bag (46, 49, 123, 127a, 127b, 227a, 337, 337a), tear means (47, 126, 136, 226a, 226b, 336) for opening the bag after first closure and second closure means for reclosing the bag after tearing the tear means (45, 48, 137, 137a, 238a, 238b, 338, 338a), wherein the paper bag is formed of a paper having the following properties:
  a grammage of 70 to 150 g/m$^2$ according to ISO 536: 2012;
  a tensile index in the machine direction (MD) of 80 to 120 Nm/g according to ISO 1924-3:2005;
  a tensile index in the cross direction (CD) of 45 to 80 Nm/g according to ISO 1924-3:2005;
  a TEA index in the MD of 1.7 to 3.5 J/g according to ISO 1924-3:2005;
  a TEA index in the CD of 2.0 to 3.5 J/g according to ISO 1924-3:2005;
  a bending resistance index in the MD of 115 to 300 Nm$^6$/kg$^3$ according to ISO 2493-1:2010;
  a bending resistance index in the CD of 80 to 145 Nm$^6$/kg$^3$ according to ISO 2493-1:2010;

a puncture force index of 80 to 120 Nm$^2$/kg according to EN-14477;
a burst index of 5.0 to 6.5 kPam$^2$/g according to ISO 2758:2014;
a stretchability in the MD of 2.0 to 5.0% according to ISO 1924-3:2005;
a virgin fiber content of at least 90%; and
a soft wood fiber content of at least 70%,
wherein the bending resistance is tested using a bending angle of 15° and a test span length of 10 mm.

2. A paper bag according to claim 1, wherein the paper further has one or more of the following properties:
a tear index of at least 10.0 mNm$^2$/g in the MD and CD according to ISO 1974:2012;
a static friction coefficient of 0.40 to 0.60 according ISO 15359:1999;
a puncture work index of 25 to 40 Jm$^2$/kg according to EN-14477; and
a stretchability in the CD of 6.0 to 10.0% according to ISO 1924-3:2005.

3. A paper bag according to claim 1, wherein the paper further has one or more of the following properties:
a grammage of 90 to 120 g/m$^2$ according to ISO 536: 2012;
a tensile index in the MD of 85 to 105 Nm/g according to ISO 1924-3:2005;
a tensile index in the CD of 50 to 70 Nm/g according to ISO 1924-3:2005;
a TEA index in the MD of 2.0 to 3.0 J/g according to ISO 1924-3:2005;
a TEA index in the CD of 2.5 to 3.5 J/g according to ISO 1924-3:2005;
a bending resistance index in the MD of 125 to 260 Nm$^6$/kg$^3$ according to ISO 2493-1:2010;
a bending resistance index in the CD of 85 to 140 Nm$^6$/kg$^3$ according to ISO 2493-1:2010;
a puncture force index of 87 to 110 Nm$^2$/kg according to EN-14477;
a burst index of 5.3 to 6.2 kPam$^2$/g according to ISO 2758:2014M
a virgin fiber content of at least 95%;
a soft wood fiber content of at least 80%;
a tear index of 10.0 to 14.0 mNm$^2$/g in the MD and CD according to ISO 1974:2012;
a static friction coefficient of 0.43 to 0.57 according ISO 15359:1999;
a puncture work index of 27 to 39 Jm$^2$/kg according to EN-14477;
a stretchability in the MD of 2.5 to 4.5% according to ISO 1924-3:2005; and
a stretchability in the CD of 7.0 to 9.0% according to ISO 1924-3:2005.

4. A paper bag according to claim 1, wherein the first closure means comprises a first foldable flap portion (46, 123, 227, 337), the tearing means comprises a first tear line (47, 126, 136, 226a, 226b, 336) and the means for reclosing comprises a second foldable flap portion (45, 137a, 234, 338).

5. A paper bag according to claim 4, wherein the first (46, 337) and second (45, 338) flap portions are arranged on one and the same foldable flap (43, 334) and wherein the first tear line (47, 336) divide the foldable flap (43, 334) into the first (46, 337) and second (45, 338) foldable flap portions.

6. A paper bag according to claim 1, further comprising a handle portion (124, 134, 224a, 224b) with a handle (25, 35, 225, 235) which handle portion is arranged to be torn off from the bag when it is opened.

7. A paper bag according to claim 1, further comprising:
a first wall panel (120, 220, 320) having two side edges (121a, 121b, 221a, 221b, 321a, 321b) and a bottom edge (122);
a second wall panel (130, 230) having two side edges (131a, 131b, 231a, 231b) and a bottom edge (132, 232); wherein:
the side edges (121a, 121b, 221a, 221b) and the bottom edge (122, 222) of the first wall panel (120, 220) are joined to the corresponding side edges (131a, 131b, 231a, 231b) and bottom edge (132, 232) of the second wall panel (130, 230) leaving an opening between the first and second wall panel; and wherein
at least one of the wall panels (120, 130, 220) comprises an upper handle portion (124, 134, 224a, 224b) provided with a handle (125, 135, 225, 235); the bag further comprising
a first tear line (126, 136, 226a, 226b) extending from one side edge (121a, 131a, 221a) to the other (121b, 131b, 221b) and arranged between the handle portion (124, 134 224a, 224b) and the bottom edge (122, 132, 222, 232) of said at least one wall panel (120, 130, 220) for tearing of the handle portion;
a first closure glue line (127a, 127b, 227a) extending between the side edges (121a, 121b, 221a, 221b) of at least one wall panel (120, 220) and arranged for first closure of the opening; and
a second glue line (137, 238a, 238b) extending between the side edges (131a, 131b, 231a, 231b) of at least one wall panel (130, 230) and arranged for second closure of the bag after tearing off the at least one upper handle portion (124, 134, 224a, 224b).

8. The bag according to claim 1, wherein the handle is formed of a second tear line arranged in the handle portion for punching out a through hole handle.

9. The bag according to claim 1, comprising at least two first closure glue lines (127a, 127b) which are covered by a single peel strip (129) and/or at least two second closure glue lines (238a, 238b), which are covered by a single peel strip.

10. The bag according to claim 1, wherein the first (20, 30, 120, 130, 220, 230, 320, 330) and second panels are formed in one piece of paper.

11. The bag according to claim 1, wherein the bottom edges (122, 132, 222, 232, 322, 332) of the first (120, 220, 320) and second (130, 230, 330) wall panels are joined by means of a gusset portion (140, 240, 340).

12. The bag according to claim 1, wherein the first (49, 127a, 127b, 227a, 337a) and/or the second (48, 137, 238a, 238b 338a) closure glue line comprises a pressure sensitive adhesive such as a cold-melt or hot-melt adhesive.

13. The bag according to claim 1, wherein the first tear line (47, 126, 136, 226a, 226b, 336) comprises a perforation and/or a line of reduced paper material and/or a tear strip and/or a tear string attached to the paper material.

14. A paper bag according to claim 1, wherein the paper for forming the bag is unbleached or bleached.

* * * * *